United States Patent Office 3,483,256
Patented Dec. 9, 1969

---

3,483,256
PROCESS FOR THE PREPARATION OF DI(N,N-DIHYDROCARBYLAMINO) ACETYLENES
Serge Y. Delavarenne, Wemmel, and Heinz G. Viehe, Linkebeek, Belgium, assignors to Union Carbide Corporation, a corporation of New York
No Drawing. Filed Sept. 15, 1967, Ser. No. 668,175
Int. Cl. C07c 85/00, 87/24
U.S. Cl. 260—583                                            9 Claims

---

Disubstituted acetylenic compositions, such as di(N,N-diethylamino)acetylene, are prepared from the corresponding 1,1-disubstituted ethylenes by alpha-elimination followed by intramolecular rearrangement in the presence of bases.

---

This invention relates to the preparation of disubstituted acetylenic compositions. In one aspect, this invention relates to the preparation of disubstituted acetylenic compounds from 1,1-disubstituted ethylenes. In a further aspect, this invention relates to the synthesis of ynediamine from haloketene N,N-acetals.

Prior to the instant invention the synthesis of disubstituted acetylenes was effected by one or more known methods of synthesis. For instance, a common reaction involved the elimination of hydrogen halide from 1,2-disubstituted ethylenes in the presence of a base:

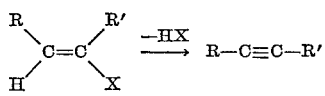

Other well known reactions involved the elimination of a molecule of halogen in the presence of a metal:

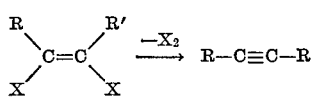

However, to date, process for the preparation of disubstituted acetylenes which involved an intramolecular rearrangement has been reported only in the case of tolane synthesis.

It is therefore an object of this invention to provide a novel process for the preparation of disubstituted acetylenic compositions. Another object of this invention is to provide a novel process for the preparation of disubstituted acetylenic compositions from 1,1-disubstituted ethylenes. A further object is to provide a novel process for preparing disubstituted acetylenes which involves alpha-elimination followed by intramolecular rearrangement in the presence of bases. A still further object of this invention is to provide a novel process for the synthesis of ynediamines from haloketene N,N-acetals. These and other objects will readily become apparent to those skilled in the art in the light of the teachings herein set forth.

In its broad aspect, the present invention relates to a process for the preparation of disubstituted acetylenes of the formula:

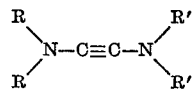

wherein R and R' represent the same or different monovalent hydrocarbon groups and two R groups on the same nitrogen atom can together form a divalent aliphatic group, such as a hydrocarbon group, i.e., alkylene, or a group containing atoms other than carbon and hydrogen, such as oxygen or nitrogen, i.e., an alkyleneoxyalkylene group and the like.

The process comprises contacting in an inert atmosphere and at a temperature below at least about −60° C., a base and a haloketene N,N-acetal of the formula:

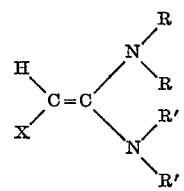

wherein X represents halogen and R and R' have the same value as above. The R groups in the above formulae can be alkyl, aryl, alkaryl, aralkyl, alkenyl, cycloalkenyl, and the like. For example, R can be methyl, ethyl, n-butyl, tertiary-butyl, 2,2-dimethyl-n-propyl, iso-octyl, octadecyl, phenyl, phenylethyl, terphenyl, cumyl, mesityl, cyclopentyl, ethylcyclohexenyl, alkyl, and the like. The two R groups on the same nitrogen atom can together be tetramethylene, pentamethylene, 3-ethylhexamethylene, decamethylene, ethyleneoxyethylene, and the like. It is preferred that the R groups each contain from 1 to 18 carbon atoms. The R groups can be the same or different throughout the same molecule. Moreover, when both R groups together form a ring with the nitrogen to which they are attached, it is preferred that the ring contain at least 5 atoms.

While not wishing to be bound by any theory regarding the mechanism by which the disubstituted acetylene compositions of this invention are formed, it is believed that the chloroketene N,N-acetal in the presence of strong, anhydrous bases, loses HCl and forms an "onium" bridged compound as an intermediate product. Thereafter migration of one of the amine groups provides the desired disubstituted acetylene compound in accordance with the reaction:

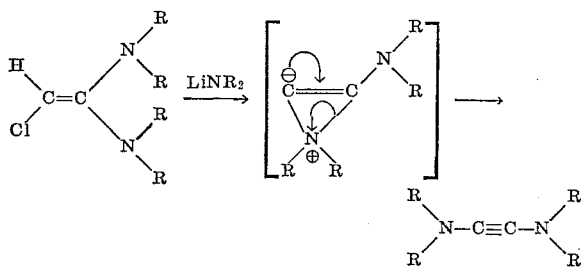

wherein R has the same value as previously indicated. In addition to amino groups, it has also been observed that an "onium rearrangement" can occur for other substituents such as the following:

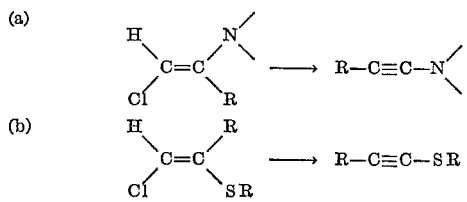

Thus, by the process of this invention, a wide variety of disubstituted acetylenes can be prepared by alpha-elimination of HCl or Cl₂ and intramolecular rearrangement.

The bases which have been found to be suitable for use in effecting alpha-elimination and intramolecular rearrangement of the haloketene N,N-acetals are strong, anhydrous bases, such as lithium alkyls, e.g., lithium butyl; dialkyl lithium amides, e.g.,

wherein R is as previously defined, sodium amide, and the like. However, in practice it has been found that sodium or potassium amide in liquid ammonia are the preferred bases. When bases such as potassium or sodium hydroxide are employed aminoamides are formed by hydrolysis of the corresponding ynediamine.

The chloroketene N,N-acetals employed as the starting materials in this invention can be conveniently prepared by one or more methods. For example, they can be prepared from the dihaloacetylenes using the method described by E. Ott, G. Dittus, and H. Weisenburger, Berichte 76, 86 (1943) or directly from the 1,1,2-trihaloethenes and lithium N,N-disubstituted amide in accordance with the reaction:

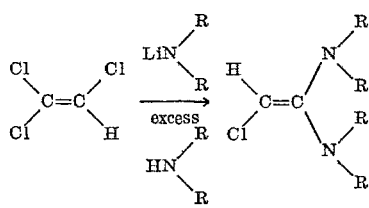

wherein R has the same value as previously indicated and need not be the same for the lithium amide and the amine.

In the second method, a suspension of one equivalent of the corresponding lithium dialkyl amide (prepared from the calculated amount of amine and from a standard n-butyl lithium solution in hexane) is added dropwise to a stirred solution of one equivalent of a 1,1,2-trihaloethylene and three to four equivalents of amine in ether at −78° C. and under a nitrogen atmosphere the reaction mixture is allowed to attain room temperature over a period of a few hours after which it is transferred quantitatively into a Carius tube and heated at 100° C. for about 15 hours. The product is cooled, extracted with ether, filtered and concentrated. After evaporation of the solvents, the residue is distilled under vacuo to provide the haloketene N,N-acetal.

As hereinbefore indicated, the disubstituted acetylene compounds are prepared by contacting the haloketene N,N-acetal with a base under an inert atmosphere and at temperatures below about −60° C. Preferably, the haloketene N,N-acetal is dissolved in an inert, liquid organic solvent and added gradually to the base, also in a solvent, at a temperature below −60° C. and under an inert atmosphere. After the reaction is completed, the mixture is allowed to reach room temperature and the solvent evaporated. The residue is then recovered and purified by conventional techniques to provide the desired disubstituted acetylene.

Suitable organic solvents useful in the process of this invention include hydrocarbons, hydrocarbonethers, and the like. Illustrative solvents include liquid ammonia, hydrocarbons such as petroleumether, cyclohexane, 2-ethylhexane, and the like; ethers such as diethylether, diisopropylether, methylbutylether, tetrahydrofuran, and the like.

As previously indicated it is preferable to carry out the process of this invention under anhydrous conditions and in the absence of oxygen. This is conveniently accomplished by using an atmosphere of inert gas, such as nitrogen, argon, helium and the like.

It is critical to the process of the invention that the reaction be carried out at low temperaures. In practice, the temperature should be below at least about −60° C., and more preferably below about −75° C.

The disubstituted acetylenes of this invention are produced in recoverable quantities in times which vary from a few minutes to several hours, depending upon the various reaction conditions, temperature and other factors.

The disubstituted acetylene compounds which are prepared by the process of this invention, often also referred to as ynediamines, are useful in a wide variety of applications. For example, these compositions react with hydrogen halides with the formation of hydrogen halide salts, and are therefore useful under anhydrous conditions as hydrogen halide acceptors. For example, the compounds prepared by the process of this invention can be used as hydrogen halide acceptors in the process for producing cyclopentadienyl metal compounds described in U.S. Patent 3,071,605 which was issued Jan. 1, 1963.

The following examples are all illustrative:

EXAMPLES 1–3

Preparation of chloroketene N,N-acetals

To a stirred solution of one equivalent of CCl₂=CClH and three to four equivalents of amine in ether was added dropwise at −78° C. and under a nitrogen atmosphere a suspension of one equivalent of the corresponding lithium dialkyl amide prepared from the calculated amounts of amine and of a standard n-butyl lithium solution in hexane. The reaction mixture was allowed to attain room temperature in a few hours after which it was transferred quantitatively into a Carius tube and heated at 100° C. during 15 hours. After cooling, the material in the reaction tube was extracted with ether, filtered and concentrated. After evaporation of the solvents the dark brown residue was distilled under vacuo and afforded the corresponding chloroketene N,N-acetals. The structure of the desired products were confirmed by hydrolysis to the corresponding known chloroacetamides.

The starting materials, products obtained, boiling point and yields are set forth in Table I below.

taken up with ether, filtered, concentrated and distilled. When lithium organics were used, two equivalents of

TABLE I.—PREPARATION OF CHLOROKETENE N,N-ACETALS

| Example: | Starting Material | Lithium amide | Sec. amine | Chloroketene N,N-acetal | Boiling Point, °C. at 0.01 mm. | Yield, percent |
|---|---|---|---|---|---|---|
| 1 | $CCl_2=CClH$ | $LiN(C_2H_5)_2$ | $HN(C_2H_5)_2$ | $\begin{array}{c}H\\ \phantom{x}\\ Cl\end{array}\!\!C\!=\!C\!\!\begin{array}{c}N(C_2H_5)_2\\ \phantom{x}\\ N(C_2H_5)_2\end{array}$ | 50–52 | 65 |
| 2 | $CCl_2=CClH$ | $LiN(C_3H_7)_2$ | $HN(C_3H_7)_2$ | $\begin{array}{c}H\\ \phantom{x}\\ Cl\end{array}\!\!C\!=\!C\!\!\begin{array}{c}N(C_3H_7)_2\\ \phantom{x}\\ N(C_3H_7)_2\end{array}$ | 74–76 | 35 |
| 3 | $CCl_2=CClH$ | $LiN(C_3H_7)_2$ | $HN(C_2H_5)_2$ | $\begin{array}{c}H\\ \phantom{x}\\ Cl\end{array}\!\!C\!=\!C\!\!\begin{array}{c}N(C_3H_7)_2\\ \phantom{x}\\ N(C_2H_5)_2\end{array}$ | 55–57 | 50 |

EXAMPLES 4–10

Preparation of ynediamines

To a molar suspension of sodium amide in liquid ammonia was added dropwise at —78° C. and under a nitrogen atmosphere an ethereal solution of the chloroketene N,N-acetal, the molar ratio of acetal to sodium amide being 1 to 3. After the addition, the reaction mixture was allowed to stand at room temperature, usually overnight, until most of the solvent has evaporated under a very slow stream of nitrogen. The residue was then lithium derivatives were added at —78° C. and under a nitrogen atmosphere to one equivalent of the chloroketene N,N-acetal in an excess of ether. After standing at room temperature during periods of time varying from 1 to 5 hours, the reaction mixture was worked up as in the other examples. When the lithium organics were used redistillation was often necessary to obtain the pure ynediamine. The particular starting materials, ynediamines obtained, and other pertinent data are set forth in Table II below.

TABLE II.—SYNTHESIS OF YNEDIAMINES FROM CHLOROKETENE N,N-ACETALS

Chloroketene N,N-Acetals $$\begin{array}{c}H\\ \phantom{x}\\ Cl\end{array}\!\!C\!=\!C\!\!\begin{array}{c}NR_1R_1\\ \phantom{x}\\ NR_2R_2\end{array}$$

| | | | | | Boiling point, 0° C. at 0.01 mm. | Yield, percent | C | | H | | N | |
|---|---|---|---|---|---|---|---|---|---|---|---|---|
| Example | $R_1$ | $R_2$ | Base | Ynediamines | | | Calc. | Found | Calc. | Found | Calc. | Found |
| 4 | $C_2H_5$ | $C_2H_5$ | $LiN(C_2H_5)_2$ | $(C_2H_5)_2N—C≡C—N(C_2H_5)_2$ | 31–33 | 79 | 71.36 | 71.31 | 11.98 | 11.97 | 16.65 | 16.73 |
| 5 | $C_2H_5$ | $C_2H_5$ | $LiC_6H_5$ | $(C_2H_5)_2N—C≡C—N(C_2H_5)_2$ | 31–33 | 65 | | | | | | |
| 6 | $C_2H_5$ | $C_2H_5$ | $NaNH_2$ | $(C_2H_5)_2N—C≡C—N(C_2H_5)_2$ | 31–33 | 85 | | | | | | |
| 7 | $CH_3$ | $CH_3$ | $NaNH_2$ | $(CH_3)_2N—C≡C—N(CH_3)_2$ | 20–22 | 70 | 64.28 | 64.1 | 10.79 | 10.65 | 24.96 | 24.75 |
| 8 | $CH_3$ | $nC_3H_7$ | $NaNH_2$ | $(CH_3)_2N—C≡C—N(C_3H_7)_2$ | 40–42 | 89 | 71.36 | 70.4 | 11.98 | 12.3 | 16.55 | 17.5 |
| 9 | $nC_3H_7$ | $nC_3H_7$ | $NaNH_2$ | $(C_3H_7)_2N—C≡C—N(C_3H_7)_2$ | 85–90 | 90 | 74.94 | 14.12 | 12.58 | 12.49 | 12.49 | 12.25 |
| 10 | $nC_3H_7$ | $C_2H_5$ | $NaNH_2$ | $(C_3H_7)_2N—C≡C—N(C_2H_5)_2$ | 50–52 | 60 | 73.40 | 72.93 | 12.32 | 12.45 | 14.28 | 14.30 |

Although the invention has been illustrated by the preceding examples it is not to be construed as being limited to the materials employed therein, but rather the invention encompasses the generic area as hereinbefore disclosed. Various modifications and embodiments of this invention can be made without departing from the spirit or scope thereof.

What is claimed is:

1. A process for the preparation of disubstituted acetylenes of the formula:

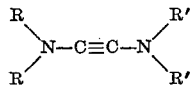

wherein R and R′ represent the same or different monovalent hydrocarbon groups free of acetylenic unsaturation and containing from 1 to 18 carbon atoms, which process comprises contacting in an inert atmosphere and at a temperature below at least about −60° C., a strong anhydrous base selected from the group consisting of alkyl lithiums, dialkyl lithiums and sodium amide and a haloketene N,N-acetal of the formula:

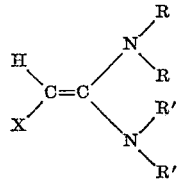

wherein X represents chlorine and R and R′ have the same value as above.

2. The process of claim 1 wherein the reaction is conducted in an inert solvent.

3. The process of claim 2 wherein said solvent is liquid ammonia.

4. The process of claim 1 wherein said strong anhydrous base is sodium amide.

5. The process of claim 1 wherein the reaction is conducted in a nitrogen atmosphere and at a temperature of below at least about −75° C.

6. The process of claim 1 wherein said haloketene N,N-diacetal is 1,1-di(N,N-diethylamino)-2-chloroethylene.

7. The process of claim 1 wherein said haloketene N,N-diacetal is 1,1-di(N,N-dipropylamino)-2-chloroethylene.

8. The process of claim 1 wherein said haloketene N,N-diacetal is 1-(N,N-diethylamino)-2-(N,N-dipropylamino)-2-chloroethylene.

9. A process for the preparation of chloroketene N,N-acetals of the formula:

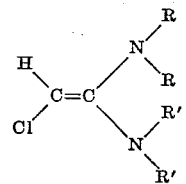

wherein R and R′ represents the same or different monovalent hydrocarbon groups free of acetylenic unsaturation and containing from 1 to 18 carbon atoms, which process comprises contacting in an inert atmosphere and at a temperature below at least about −60° C. 1,1,2-trichloroethylene and a dialkyl lithium amide of the formula:

in the presence of a secondary amine of the formula:

wherein R has the same value as above with the proviso that R in said dialkyl lithium amide and in said secondary amine need not be the same.

References Cited

FOREIGN PATENTS 1,242,215   6/1967   Germany.

CHARLES B. PARKER, Primary Examiner

R. L. RAYMOND, Assistant Examiner

U.S. Cl. X.R.

260—247, 293, 326.8, 563, 570, 570.5